US010519900B2

(12) United States Patent
Chan

(10) Patent No.: US 10,519,900 B2
(45) Date of Patent: Dec. 31, 2019

(54) MIST GENERATING APPARATUS FOR USE IN A VEHICLE

(71) Applicant: Ka Keung Chan, Pak Shek Kok (HK)

(72) Inventor: Ka Keung Chan, Pak Shek Kok (HK)

( * ) Notice: Subject to any disclaimer, the term of this patent is extended or adjusted under 35 U.S.C. 154(b) by 240 days.

(21) Appl. No.: 15/687,895

(22) Filed: Aug. 28, 2017

(65) Prior Publication Data

US 2018/0142648 A1 May 24, 2018

(30) Foreign Application Priority Data

Nov. 18, 2016 (HK) ................................ 16113259.1

(51) Int. Cl.

| | |
|---|---|
| ***F02M 25/025*** | (2006.01) |
| ***F02M 25/022*** | (2006.01) |
| ***B01F 3/04*** | (2006.01) |
| ***B01F 5/06*** | (2006.01) |
| ***B01F 7/16*** | (2006.01) |
| ***B01F 7/22*** | (2006.01) |
| ***B01F 15/00*** | (2006.01) |

(52) U.S. Cl.

CPC ..... *F02M 25/0225* (2013.01); *B01F 3/04028* (2013.01); *B01F 5/0691* (2013.01); *B01F 7/162* (2013.01); *B01F 7/22* (2013.01); *B01F 15/00915* (2013.01); *B01F 2215/0086* (2013.01)

(58) Field of Classification Search

CPC ........................ B01F 3/04042; B01F 3/04078; B01F 5/0691; B01F 5/0693; B01F 5/0694; B01F 7/00633; B01F 7/00616; B01F 7/162; B01F 7/22; B01F 13/1016; B01F 15/00915; B01F 15/00935; B01F 15/0258; B01F 2215/0086; F02M 25/0225; Y02T 10/121

USPC ......................................... 261/78.1, 78.2, 84

See application file for complete search history.

(56) References Cited

U.S. PATENT DOCUMENTS 2,119,922 A * 6/1938 Lutz ....................... F02M 15/02 261/144
4,485,795 A * 12/1984 Lockard ................ F02M 29/02 123/590
4,869,849 A * 9/1989 Hirose .................. B01F 5/0682 261/78.2

(Continued)

FOREIGN PATENT DOCUMENTS

EP 0 155 024 B1 * 1/1988

*Primary Examiner* — Charles S Bushey

(57) ABSTRACT

The invention provides an apparatus for generating mist, having: a container adapted to accommodate a liquid, the container having an inlet for receiving an incoming fluid stream into the container, and an outlet via which an outgoing fluid stream exits the container; at least one agitator arranged in the container for agitating the accommodated liquid to generate droplets of the liquid; wherein the agitator is arranged to be driven by the incoming fluid stream, such that the generated liquid droplets are caused by the incoming fluid stream to form the outgoing fluid stream, and subsequently, exit the container. The invention also provides a system for generating mist, having: a plurality of the above described apparatuses, having at least a first apparatus having a first inlet and a first outlet, and a second apparatus having a second inlet and a second outlet; wherein the first outlet is adapted to be connected with the second inlet to thereby allow fluid communication between the first apparatus and the second apparatus.

21 Claims, 16 Drawing Sheets

(56) References Cited

U.S. PATENT DOCUMENTS

| | | | | |
|---|---|---|---|---|
| 6,213,453 | B1 * | 4/2001 | Ou | F02M 29/04 261/78.1 |
| 2015/0103617 | A1 * | 4/2015 | Dujardin | C12M 23/26 366/102 |
| 2015/0298095 | A1 * | 10/2015 | Ashe | B01F 5/0619 423/659 |

* cited by examiner

MIST GENERATING APPARATUS FOR USE IN A VEHICLE

FIELD OF THE INVENTION

The invention relates to a mist generating apparatus for use in a vehicle, particularly but not exclusively, to an apparatus for generating mist to a combustion engine of the vehicle.

BACKGROUND OF THE INVENTION

It is known that the emission of exhaust gases from combustion engines of vehicles contributes significantly to atmospheric pollution. Exhaust gases from both gasoline and diesel-fueled engines contain various combustion by-products for example, hydrocarbons, oxides of carbon such as carbon monoxide, and oxides of nitrogen and sulfur which are known to be harmful to the environment, particularly when emitted as micro-particulates. These especially harmful particulate contaminants are at their peak when combustion engines are run without sufficient oxygen to fully combust their fuel.

It is also known that an increased amount of these harmful combustion by-products will be produced if the combustion engines are run at low power level and/or operate at high temperature, during which efficiency of the engines will decline and possibly, lead to incomplete combustion of the fuel. Various systems such as catalytic converters and air injection systems have been developed which attempt to reduce the production and/or emission of these harmful by-products and also to increase efficiency of the combustion engines. In some modern engines, humid air such as steam has been injected into the combustion engines to improve performance of the engines and to reduce emission of the harmful substances.

OBJECTS OF THE INVENTION

An object of the present invention is to provide an apparatus for generating mist for use in a vehicle.

Another object of the present invention is to mitigate or obviate to some degree one or more problems associated with the prior art, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides an apparatus for generating mist, comprising: a container adapted to accommodate a liquid, the container comprising an inlet for receiving an incoming fluid stream into the container, and an outlet via which an outgoing fluid stream exits the container; at least one agitating means arranged in the container for agitating the accommodated liquid to generate droplets of the liquid; wherein the agitating means is arranged to be driven by the incoming fluid stream, such that the generated liquid droplets are caused by the incoming fluid stream to form the outgoing fluid stream, and subsequently, exit the container.

In a second main aspect, the invention provides a system for generating mist, comprising: a plurality of apparatuses according to the first main aspect, the plurality of apparatuses comprising: at least a first apparatus having a first inlet and a first outlet, and a second apparatus having a second inlet and a second outlet; wherein the first outlet is adapted to be connected with the second inlet to thereby allow fluid communication between the first apparatus and the second apparatus.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
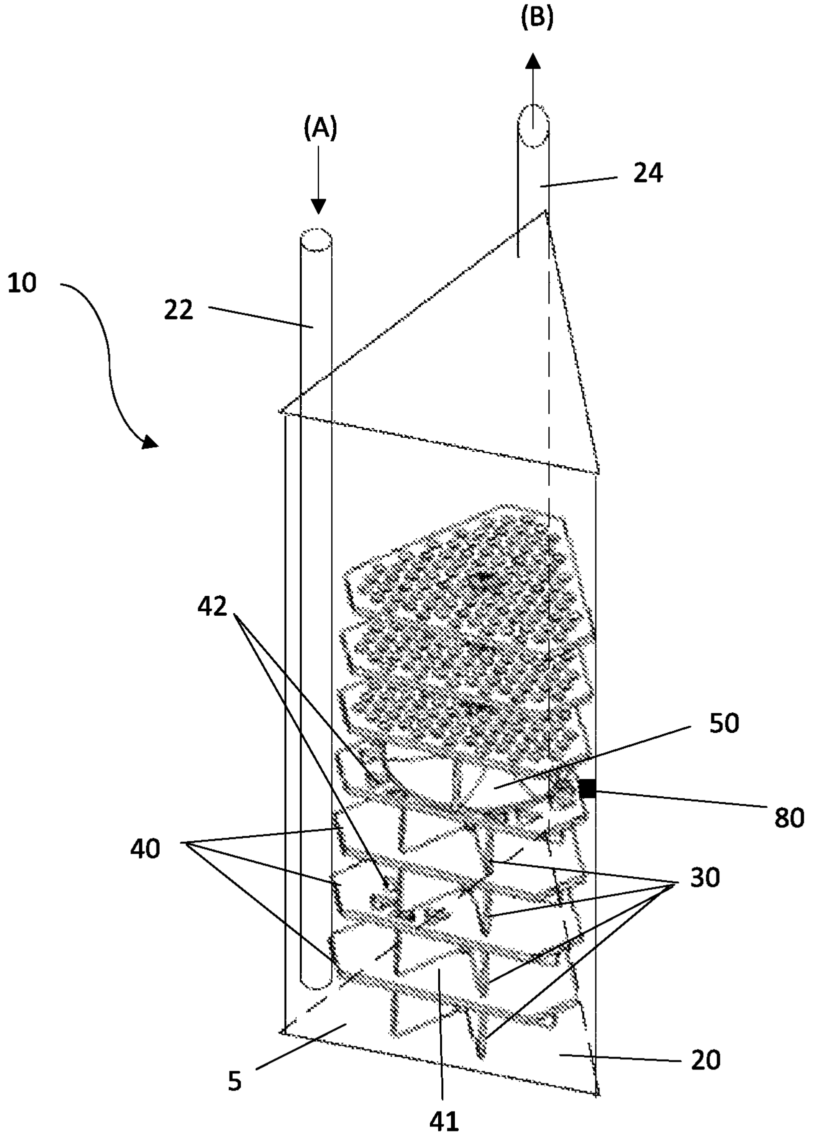
FIG. 1 is an internal perspective view showing an embodiment of the mist generating apparatus of the present invention.

Referring to FIG. 1, shown is an embodiment of an apparatus 10 for generating mist, particularly but not exclusively, for use in a vehicle powered by an internal combustion engine. The apparatus 10 is adapted to generate mist from a liquid, with the mist then being transferred or conveyed to a combustion chamber of the internal combustion engine of the vehicle, although a person skilled in the art will appreciate that the apparatus 10 can be utilised to generate mist for use in other internal parts, components or operating regions of the vehicle, as long as it is considered suitable and applicable.

In the context of the present description, the term "vehicle" broadly refers to any form of mobile machine adapted to transport people or goods or to perform work, such as but not limited to, automobiles such as cars, trucks and buses, mobile cranes, earth movers; railed vehicles such as trains or trams; watercraft such as ships and boats; and also aircraft, as long as the vehicle is adapted to generate motive power by the combustion of fuels such as petrol, oil, gasoline, diesel or other fuels via one or more internal combustion engines. Furthermore, the term "mist" generally refers to a cloud or a stream of very fine liquid droplets, with the droplet size being small enough to suspend in the air such as in the form of an aerosol. In general, the diameter of the fine droplets of the mist is in the range of about 1 μm to about 5 mm, depending on the surface tension and density of the liquid, as well as, for example, rotating speeds of the agitating means, pore sizes of the fluid passageways and/or the filtering means, etc. of the mist generating apparatus 10.

In the embodiment as shown in the figure, the apparatus 10 comprises a container 20 adapted to accommodate a liquid 5. The liquid 5 may comprise water such as distilled water and/or oxygen enriched water. Alternatively, the liquid 5 can be an aqueous mixture of water and any known, water soluble performance enhancing agent or agents for vehicles. The container 20 may comprise an inlet 22 for receiving an incoming fluid stream (A) into the container 20, and an outlet 24 via which an outgoing fluid stream (B) exits the container 20. In the context of the present description, the term "fluid" may generally refer to any liquids, gases or a mixture of both which is capable of free flowing and with no defined shape.

Figure 2:
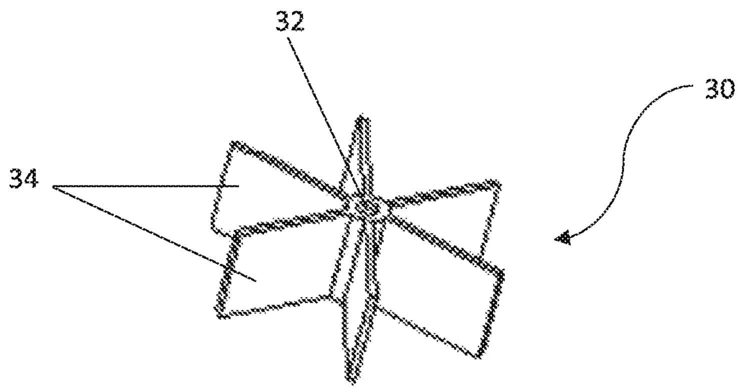
FIG. 2 is a perspective view showing a first agitating means of the apparatus of FIG. 1.
Figure 3:
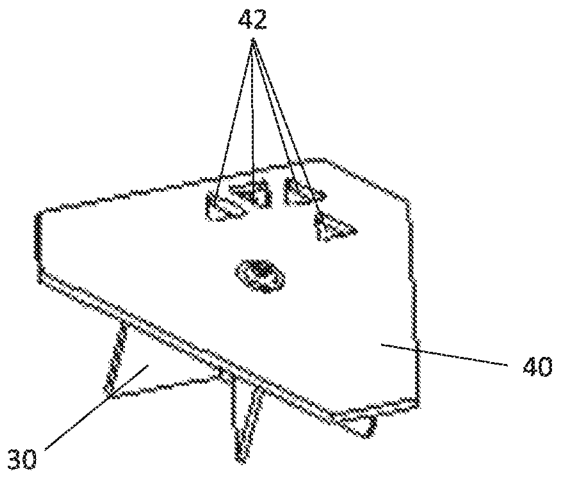
FIG. 3 is a perspective view showing a first baffle means arranged above the first agitating means of FIG. 2.
Figure 4:
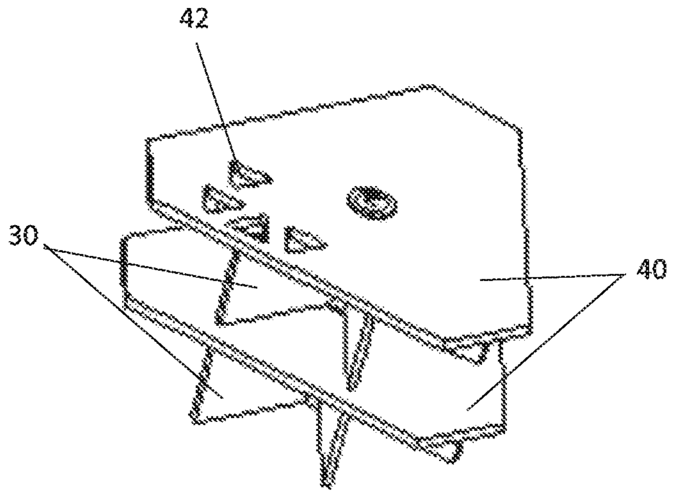
FIG. 4 is a perspective view showing a second agitating means and a second baffle means arranged above the first agitating means and the first baffle means of FIG. 3.
Figure 5:
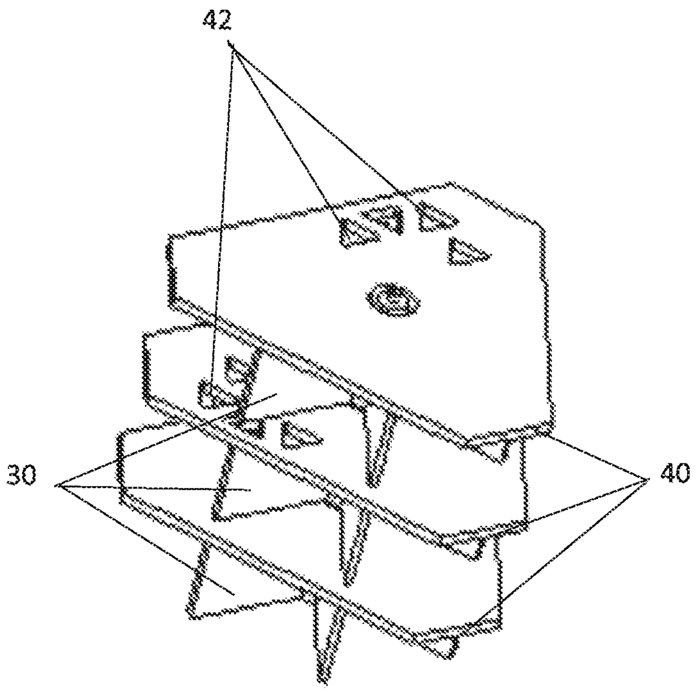
FIG. 5 is a perspective view showing a third agitating means and a third baffle means arranged above the second agitating means and the second baffle means of FIG. 4.
Figure 6:
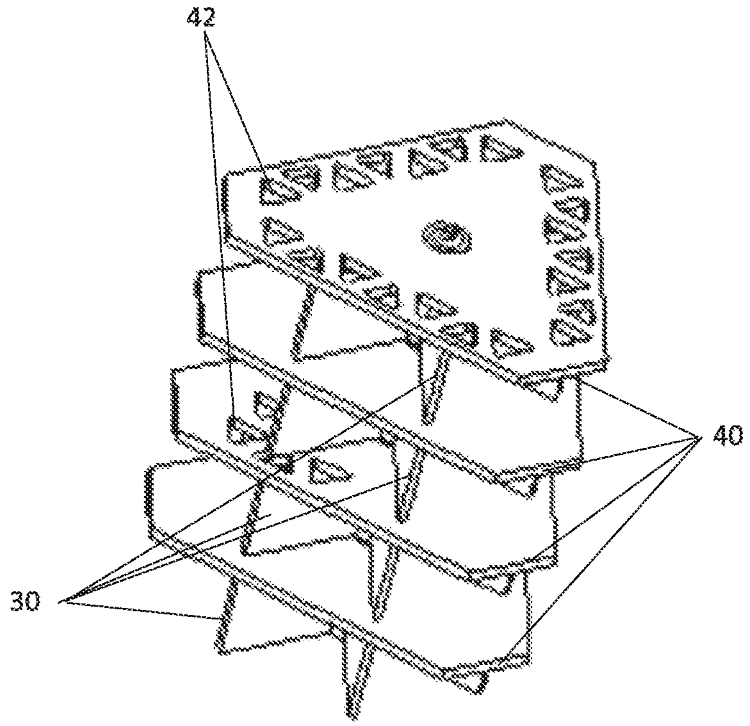
FIG. 6 is a perspective view showing a fourth agitating means and a fourth baffle means arranged above the third agitating means and the third baffle means of FIG. 5.

The apparatus 10 further comprises at least one agitating means 30 arranged in the container 20 for agitating the accommodated liquid 5 to atomize, or in other words, generate fine droplets of the liquid thereby forming a mist of the liquid. The agitating means 30 can be provided in any known forms such as, but is not limited to, a stirrer, a rotor blade, an impeller or the like, as long as it is movable to direct or force the contained liquid into motion to thereby generate droplets of the liquid. FIG. 2 illustrates a preferred embodiment of the agitating means 30 applicable to the present invention, which comprises a rotor 32 with a plurality of radially extending blade members 34.

Specifically, the outlet 24 of the container 20 can be arranged to connect via one or more conduits with a suction pipe of an internal combustion engine of the vehicle. In use, a developed negative pressure at the suction pipe by an operating combustion engine will continuously draw in ambient air at high speed via the inlet 22 thereby forming the incoming fluid stream (A). After entering the container 20 via the inlet 22, the fast moving fluid stream (A), which comprises mainly air, will be directed towards the lower portion of the container 20, and subsequently, drives the at least one agitating means 30 arranged at or near the bottom of the container 20 into movement or rotation at high speed. The agitating means 30 agitates the contained liquid 5 at a sufficiently high speed and consequently, generates fine droplets of the liquid with droplet sizes small enough to be suspended in or carried by the moving air flow in the container 20. The generated liquid droplets will then be conveyed by the moving air flow driven by the suction force to form the outgoing fluid stream (B), which exits the container 20 via the outlet 24 under pressure.

The container 20 can be configured with an elongated body with the inlet 22 and the outlet 24 provided at, for example, an upper portion of the container 20. Preferably, the container 20 can be configured in the shape of, for example, a cylinder or a prism, or more preferably, a triangular prism. A triangular, prismatic shape of the container 20 is beneficial in providing a plurality of side walls such that it allows sufficient surface areas for collisions between the water droplets and the internal surfaces of the container 20 to thereby further reduce the size of the formed liquid droplets, and yet, the configuration does not significantly compromises compactness when a plurality of apparatuses 10 are required to be operated in a system to enhance the mist generating effect. Nevertheless, a person skilled in the art would appreciate that containers in other shapes and/or configurations should also be encompassed, as long as they are considered suitable and applicable for the purpose of the present invention.

As shown in FIG. 1, the at least one agitating means 30 may comprise a plurality of agitating means 30 movably arranged along a longitudinal axis of the container 20. Preferably, the plurality of agitating means 30 are adapted to move or rotate about a common longitudinal axis such as the central axis of the container 20. In this embodiment, at least one baffle means 40 can be provided in the container 20 and preferably, arranged above the at least one agitating means 30 for controlling fluid flow in the container 20. As shown in FIGS. 1, 3 to 6, the at least one baffle means 40 can be provided in the form of, for example, one or more partitions 41 arranged to substantially traverse the flow direction of the fluid stream, and more particularly, the flow of the outgoing fluid stream (B) from the at least one agitating means 30 towards the outlet 24. Preferably, the at least one baffle means 40 may comprise one or more fluid passageways 42 for the outgoing fluid stream to pass through. The one or more fluid passageways 42 can be provided in the form of one or more openings or through holes which allow the liquid droplets of sufficiently small sizes to pass through, depending on the size and configuration of the through holes, and then continue to move upward along the container 20 towards the outlet 24. Liquid droplets above certain sizes will be blocked by and subsequently, condensed at the lower surface of the partition 41 of the baffle means 40, and then return to the contained liquid 5 and/or towards the agitating means 30 below the baffle means 40. The filtering of the small-sized droplets and the condensation of the large liquid droplets can further be enhanced by having the through holes of the fluid passageways 42 as comprising a plurality of side walls, for example, in the configuration of triangular through holes as shown in the figures. The plurality of side walls of the through holes and particularly, the acute angles formed by such side walls increase the surface areas available for contacts and collisions between the liquid droplets and the partition 41 of the baffle means 40. The resulting effect is to provide a further reduction in droplets size of the formed liquid droplets As shown in FIGS. 3 to 6, the one or more fluid passageways 42 are preferred to be arranged at or near a peripheral edge of the baffle means 40 for receiving the outgoing fluid stream (B) from the corresponding agitating means 30. More preferably, the at least one baffle means 40 comprises a plurality of baffle means 40 arranged along the longitudinal axis of the container 20, with the respective one of the plurality of agitating means 30 being arranged below and substantially covered by the corresponding one of the plurality of the baffle means 40 to thereby form an alternating arrangement along the longitudinal axis of the container 20. More preferably, the respective fluid passageways 42 of at least two adjacent baffle means 40 are positioned to be offset from one another, for example, being positioned at opposing ends of the respective baffle means 40 to cause the outgoing fluid flow (B) to travel a sufficiently long distance between the fluid passageways 42 of two adjacent and consecutive baffle means 40 to maximize the contact areas available for condensing any large liquid droplets.

In one preferred embodiment, the plurality of baffle means 40 comprise an increasing number of fluid passageways 42 from one baffle means 40 to another in a direction towards the outlet 24 and along the longitudinal axis of the container 20. More preferably, the plurality of baffle means 40 comprise fluid passageways 42 with decreasing size from one baffle means 40 to another in the direction towards the outlet 24 and along the longitudinal axis of the container 20. For the embodiment as shown in FIGS. 3 to 6, each of the triangular through holes of the fluid passageways 42 may comprise side length ranged from about 2 mm to about 10 mm for each side, for example. Again, these preferred arrangements are beneficial in providing increased contact areas and therefore, further reducing droplets size of the liquid exiting the outlet 24.

Figure 7:
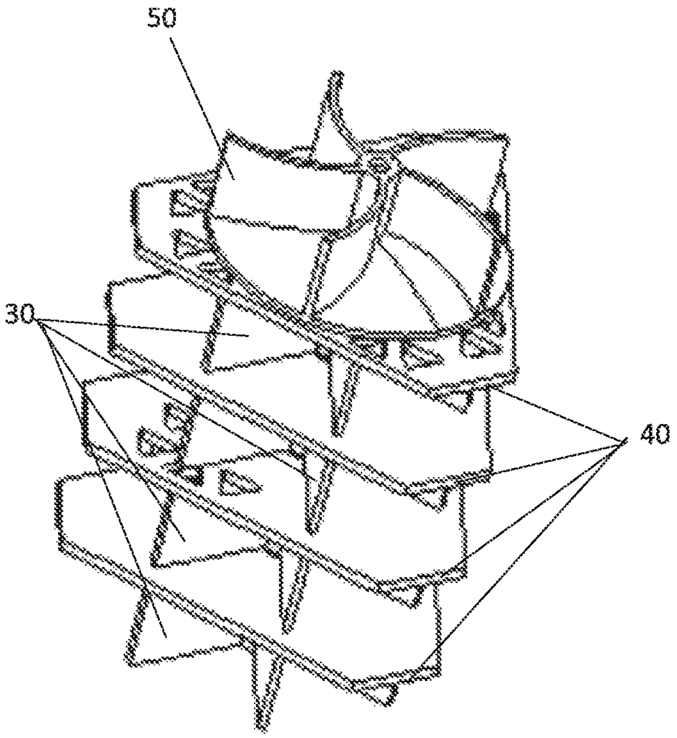
FIG. 7 is a perspective view showing a flow directing means arranged above the plurality of agitating means and baffle means of FIG. 6.

In one further embodiment, the apparatus 10 may further comprise a fluid flow directing member 50 adapted to direct flow of the outgoing fluid stream (B) towards the direction of the outlet 24 of the container 20, and optionally, to increase a flow rate of the outgoing fluid stream (B). The fluid flow directing member 50 can be provided in any known forms such as, but is not limited to, a fan, a blower, a rotor blade, an impeller or the like, as long as it is movable to direct, guide and/or force the outgoing fluid stream (B) in moving in a direction towards the outlet 24. FIG. 7 illustrates a preferred embodiment of the flow directing member 50 applicable to the present invention arranged above a top-most baffle means 40. It will be understood that the arrangement of the flow directing member 50 should not be limited to the illustrated embodiment, but any other possible configurations and positions would also be applicable as long as they are considered suitable and applicable to the purpose of the present invention.

Figure 8:
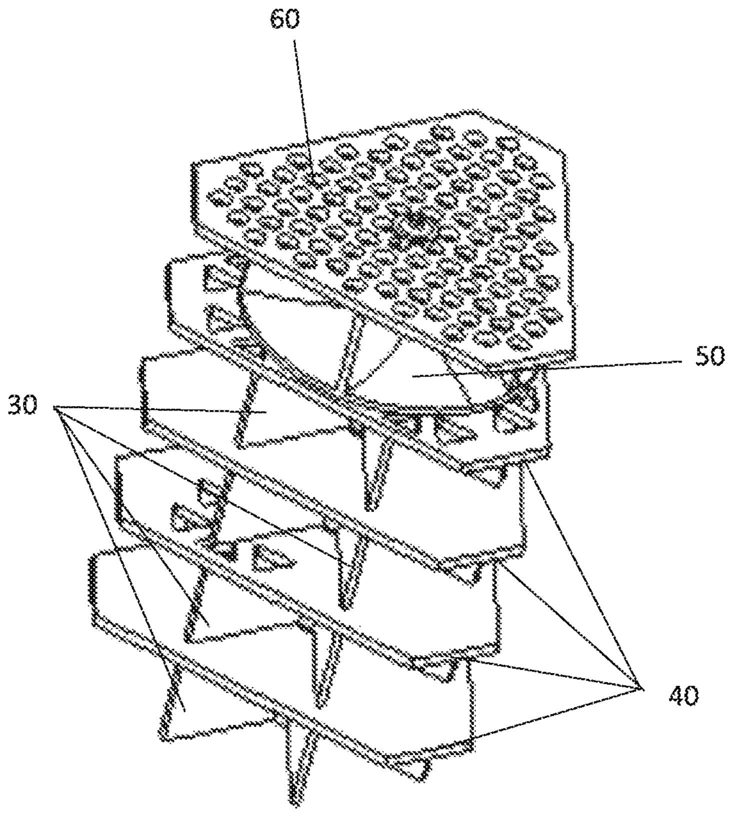
FIG. 8 is a perspective view showing a filtering means arranged above the flow directing means of FIG. 7.
Figure 9:
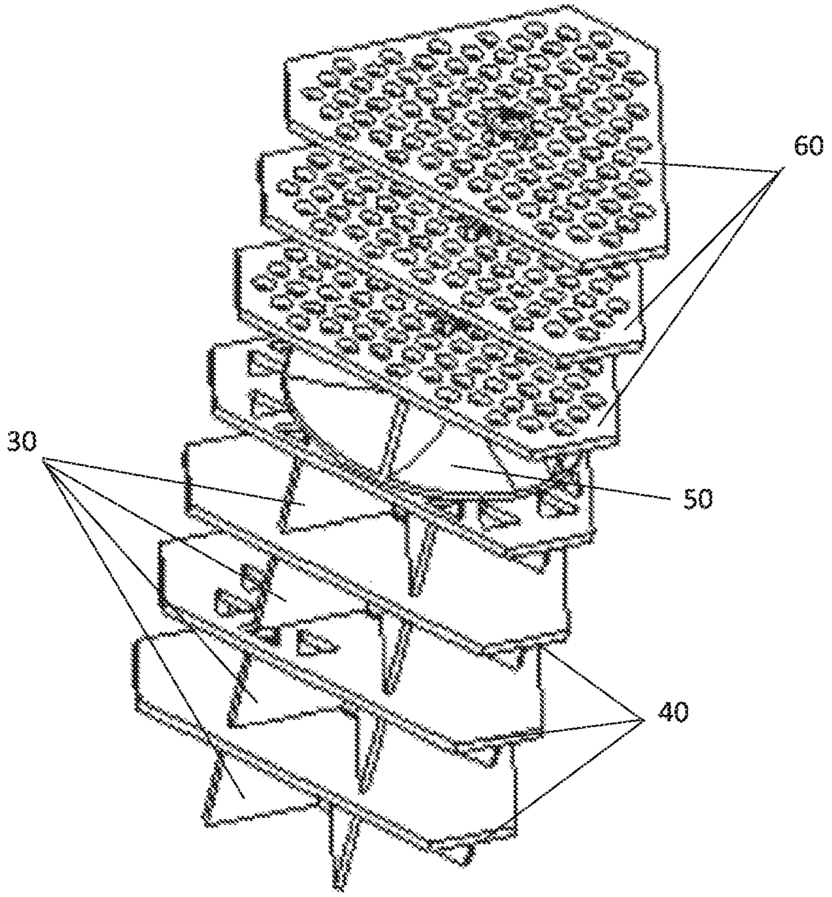
FIG. 9 is a perspective view showing a plurality of filtering means arranged above the flow directing means of FIG. 8.

More preferably, the apparatus 10 may further be arranged to comprise at least one filtering means 60 adapted to further reduce size of the liquid droplets and particularly to do so prior to exiting the container 20 via the outlet 24. The filtering means 60 can be provided in any known forms such as, but not limited to, one or more filters, sieves, meshes, or even sheet materials or fabrics with pores of a predetermined size, as long as they are adapted to filter and/or further reduce size of the generated liquid droplets carried by the outgoing fluid stream (B). FIGS. 8 and 9 illustrate a preferred embodiment of a plurality of the filtering means 60 applicable to the present invention arranged above a plurality of fluid flow directing means 50. Preferably, the plurality of filtering means 60 may each comprise pores or through holes with sizes ranged from about 0.01 mm to about 0.10 mm; and more preferably, from about 0.03 mm to about 0.05 mm. The arrangement of the filtering means 60 and/or the flow directing means 50 should not be limited to the illustrated embodiment, but any other possible configurations and positions would also be applicable as long as they are considered suitable and applicable to the purpose of the present invention.

The container 20 of the apparatus 10 is preferred to be made of one or more light-weight, rigid and corrosion resistant materials such as, but not limited to, plastics, stainless steel, aluminum or other light-weight metal alloys. More preferably, the container 20 is configured to accommodate about 1 litre of liquid, but this may vary depending on factors such as vehicle type and size, engine size, or the like. For example, one or more containers of about 500 ml in volume each may suit a small, compact car with relatively low power; while one or more containers of up to about 100 L of volume each can be applied in large watercrafts such as ocean-going vessels or tankers. In one preferred embodiment, the apparatus 10 having a container 20 with a volume of about 500 ml is capable of generating mist at flow rates ranged from about 50 ml/hr to about 100 ml/hr.

Optionally, the apparatus 10 may further comprise one or more sensors for sensing one or more conditions of the contained liquid such as liquid level and/or one or more conditions of the generated mist such as pressure, temperature and flow rate of the mist. For example, sensors 80 can be arranged at the container 20 to communicate with a printed circuit board assembly (PCBA) to thereby control operation of the apparatus 10. In one preferred embodiment, the sensors 80 may comprise a liquid level sensor arranged at the container 20 for detecting a level of the accommodated liquid. The liquid level sensor may further comprise an indicator or alarm capable of generating an audible signal such as a loud buzzing sound to alert the user of, for example, a situation when the contained liquid has exceeded a certain maximum level and/or when the contained liquid has been consumed to a predetermined minimum level. The liquid level sensor is of particular importance to avoid the contained liquid from entering the internal combustion engine of the vehicle, which may otherwise adversely affect performance of or even damage the engine of the vehicle.

Figure 10:
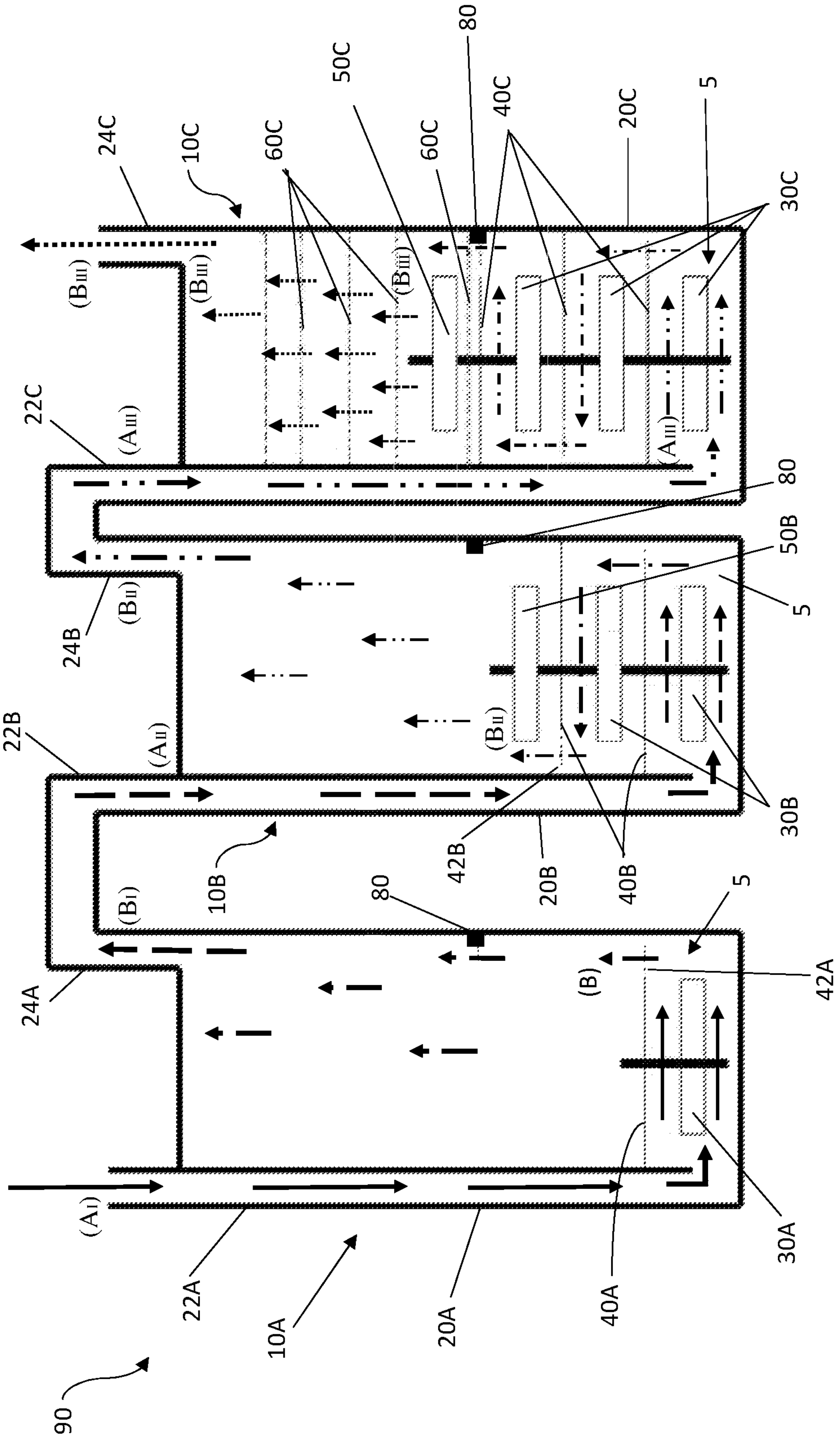
FIG. 10 is a side cross sectional view showing an embodiment of a mist generating system comprising three embodied mist generating apparatuses according to the present invention.

The present invention further relates to a system 90 for generating mist. FIG. 10 illustrates a preferred embodiment of the system 90 comprising a plurality of apparatuses 10 as described above. Preferably, the system 90 comprises at least three apparatuses 10A, 10B and 10C with their respective containers 20A, 20B and 20C connected consecutively in sequence. Each of the containers 20A, 20B and 20C comprises a respective inlet 22A, 22B and 22C and a respective outlet 24A, 24B and 24C, with the outlet and inlet of two consecutive containers, for example, the first outlet 24A of the first container 20A, being adapted to be connected with the second inlet 22B of the second container 20B, and the second outlet 24B of the second container 20B being adapted to be connected with the third inlet 22C of the third container 20C, etc. to thereby allow fluid communication among the three apparatuses 10A, 10B and 10C. It was observed that, in one embodiment, an optimum mist generating performance can be achieved by a system having at least three apparatuses 10 connected in sequence to thereby allow an improved equilibrium of pressure within the system.

In use, the outlet 24C is adapted to be connected with the suction pipe of the internal combustion engine of the vehicle from which a negative pressure is developed to draw ambient air into the system 90 via inlet 22A to form the incoming air stream ($A_I$). The fast moving incoming air stream ($A_I$) will then drive the at least one agitating means 30A to rotate at speed, which agitates the contained liquid 5 previously introduced into the container 20 to generate liquid droplets. It is preferred that liquid of no more than half of the total volume of the first container 20A will be introduced to the container 20A. For example, for a first container having a total volume of one litre, the maximum volume of liquid introduced to the first container will be about 500 ml or less. The generated liquid droplets will then be conveyed by the moving air stream in the first container 20A to form the outgoing fluid stream ($B_I$), which passes through the fluid passageways 42A of the baffle means 40A and subsequently, exits the first container 20A via the first outlet 24A. The outgoing fluid stream ($B_I$) may comprise relatively large-sized liquid droplets carried by the fast moving air flow, which will then enter the second container 20B via the second inlet 22B as an incoming fluid stream ($A_{II}$).

After entering the second container 20B, the incoming fluid stream ($A_{II}$) will in turn drive the at least one agitating means 30B to rotate. Preferably, the second apparatus 10B may comprise a larger number of agitating means 30B than that of the first apparatus 10A. For example, as shown in the embodiment of FIG. 10, the second apparatus 10B may comprise two agitating means 30B whilst the first apparatus 10A may comprise only one agitating means 30A. Similarly, it is preferred that the second apparatus 10B may comprise a larger number of baffle means 40B than that of the first apparatus 10A, for example, the second apparatus 10B may comprise two baffle means 40B whilst the first apparatus 10A may comprise only one baffle means 40A, as shown in FIG. 10. The increased number of the agitating means 30 and baffle means 40 from the first apparatus 10A to the second apparatus 10B is advantageous in further increasing the amount of the generated liquid droplets and at the same time, reducing the droplet size of the liquid when the fluid stream proceeds from one container to another. The outgoing fluid stream ($B_{II}$) which passes through the fluid passageways 42B now comprises a mixture of a fast moving air stream, carrying with it a plurality of liquid droplets with size smaller than those being carried by the outgoing fluid stream ($B_I$). A fluid flow directing member 50B can further be provided to direct the outgoing fluid stream ($B_I$) towards the second outlet 24B of the second container 20B. The outgoing fluid stream ($B_I$) will then exit the second container 20B, and enter the third container 20C via the third inlet 22C as an incoming fluid stream ($A_{III}$).

Similar to the fluid flow paths as described for the second container 20B, the fast moving incoming fluid stream ($A_{III}$) will drive a plurality of agitating means 30C to rotate to thereby increase the amount of the generated liquid droplets. The outgoing fluid stream ($B_{III}$), which comprises a large number of very fine liquid droplets carried by a stream of fast moving air, will then pass through a plurality of baffle means 40C to further reduce the size of the droplets. In the embodiment as shown in the figure, the third apparatus 10C may comprise, for example, three agitating means 30C and three baffle means 40C. Preferably, one or more filtering means 60C can be arranged above the uppermost agitating means 30C and the baffle means 40C to further reduce the size of the liquid droplets, and to ensure only liquid droplets with sufficiently small sizes can pass through. Eventually, the very fine stream of liquid droplets will exit the third container 20C via the third outlet 24C, carrying the suspended stream of mist to the internal combustion engine of the vehicle.

Figure 11:
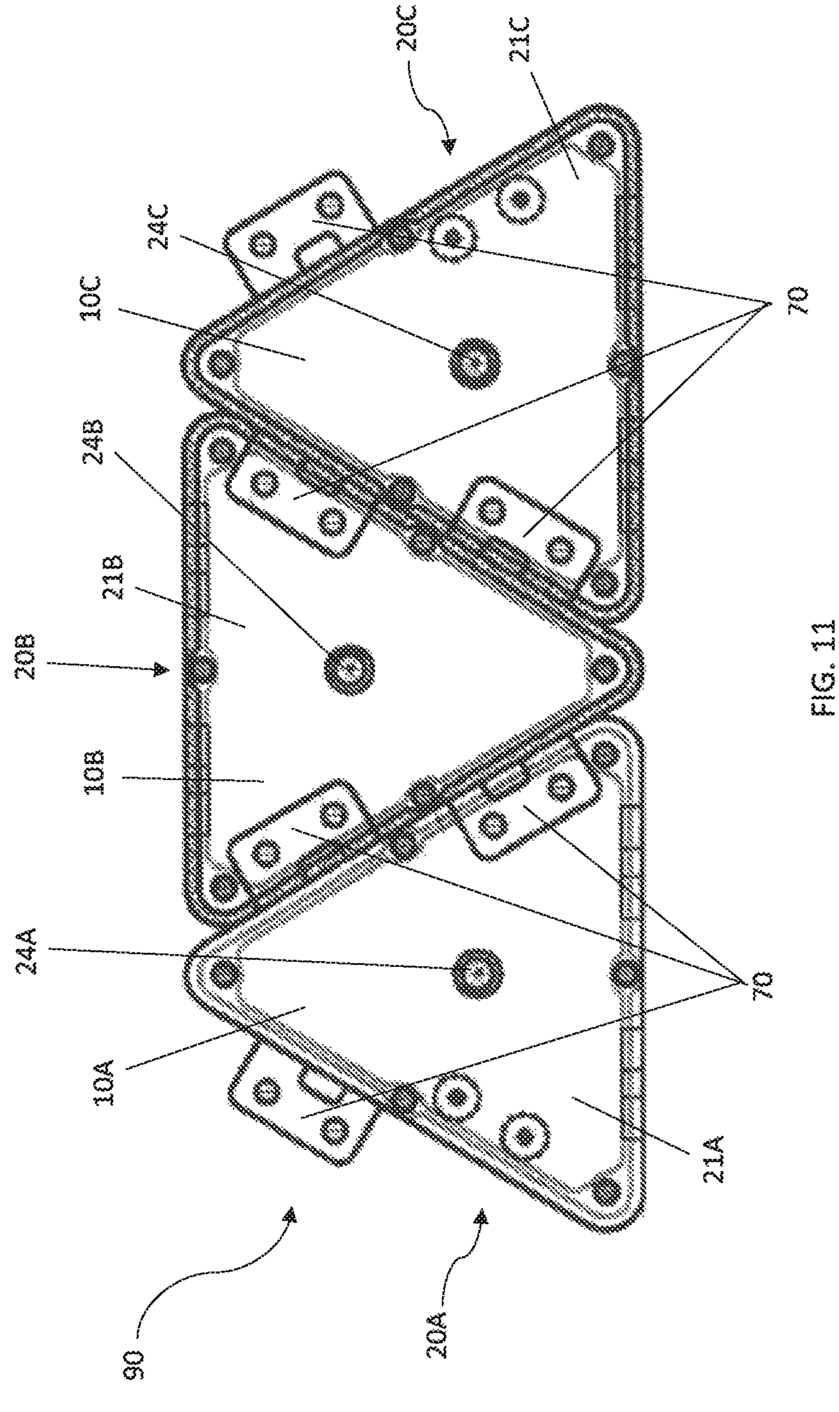
FIG. 11 is a top cross section view showing an embodiment of a mist generating system comprising three embodied mist generating apparatuses according to the present invention.

FIG. 11 shows another embodied system 90 comprising three apparatuses 10A, 10B and 10C each configured in a shape of a triangular prism and connected in series via a plurality of connecting means 70. In this embodiment, the connecting means 70 can be provided in form of one or more pivotally or hingedly connected portions arranged at peripheral edges of the lids 21A, 21B and 21C of the respective containers 20A, 20B and 20C, as shown in the figure. The triangular configuration of the apparatuses 10 is beneficial to enable a close packing arrangement of the apparatuses 10A, 10B and 10C and at the same time, allow the side walls of the triangular prismatic apparatus to support one another when they are arranged in a vehicle.

Figure 12:
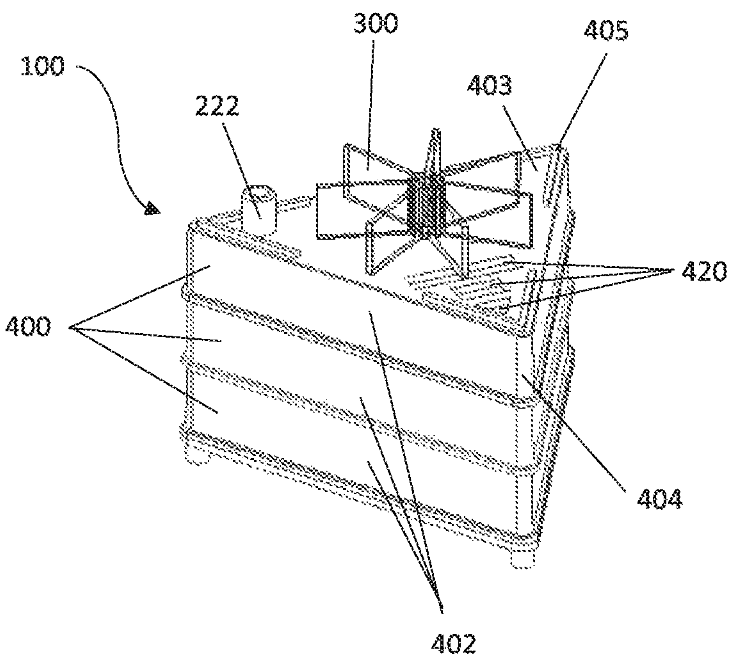
FIG. 12 is a perspective view showing the baffle means and the agitating means of another embodiment of the mist generating apparatus according to the present invention.

FIGS. 12 to 16 show an alternative embodiment of an apparatus 100 for generating mist according to the present invention. Specifically, FIG. 12 illustrates the arrangement of three baffle means 400 stackable over one another within and along the longitudinal axis of a container (not shown), which can be of a similar configuration to the container 20 as described in the previous embodiments.

As shown in the figures, each of the baffle means 400 can be configured to comprise a triangular, prismatic housing 402 having an open bottom for receiving and accommodating a respective agitating means 300 within the housing 402. In this embodiment, edges of the peripheral sides of the upper portion 403 and the lower portion 404 of the housing 402 can optionally be configured with one or more ridges 405 and/or recesses (not shown) for securely positioning or connecting two adjacent housings 402. Preferably, the one or more ridges 405 and/or recesses may comprise one or more sealing members, such as but not limited to one or more silicone seals, to thereby enable substantially leak-proof and air-tight connections between the two adjacent housings 402.

Each of the housings 402 may further comprise a conduit 222 connectable with another conduit 222 of the next, adjacent housing 402 to form a continuous inlet channel 220. The inlet channel 220 is adapted to fluidly connect the exterior and the interior of the container of the apparatus 100 for receiving the incoming fluid stream into the container. Preferably, the inlet channel 220 is adapted to convey the incoming fluid stream towards the lower portion of the container to thereby allow the liquids or liquid droplets carried by the incoming fluid stream in reaching the agitating means 300 located at the bottom of the container. The agitating means 300 may then rotate at high speed to atomize the liquid into a mist of the liquid, or to further reduce size of the liquid droplets.

Figure 13:
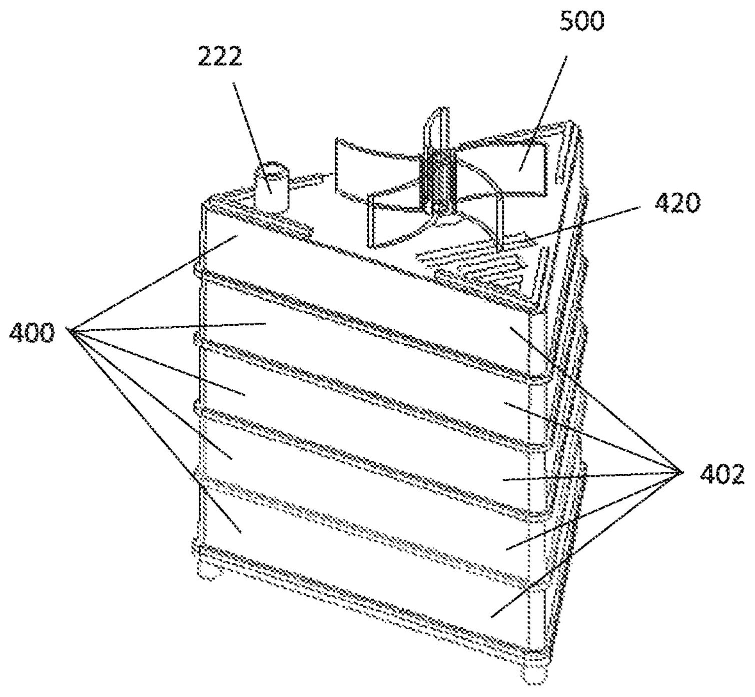
FIG. 13 is a perspective view showing the baffle means and the flow directing means of the mist generating apparatus of FIG. 12.
Figure 14:
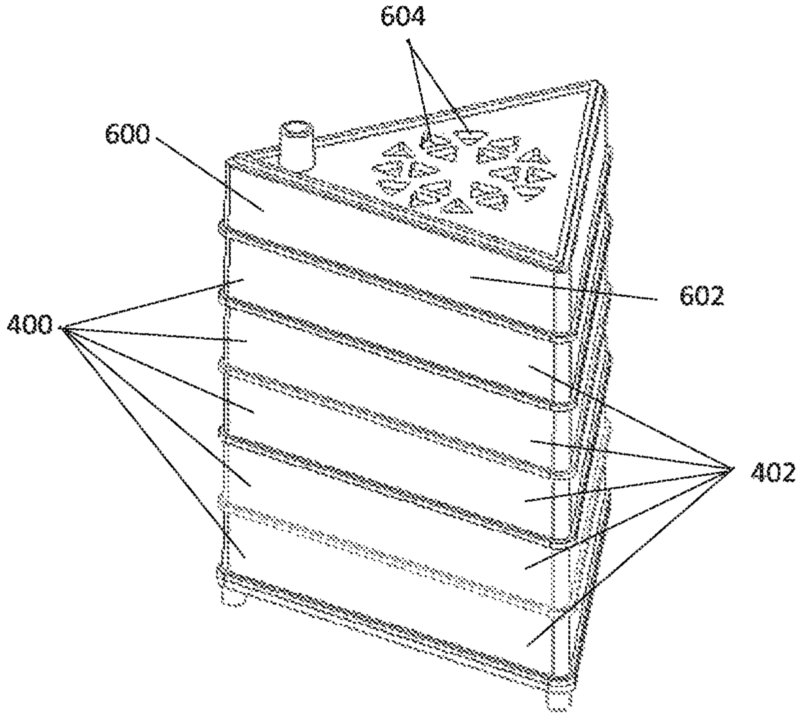
FIG. 14 is a perspective view showing the baffle means and the filtering means of the mist generating apparatus of FIG. 12.

As described earlier, liquid droplets generated by the agitating means 300 will be conveyed upwardly and longitudinally along the container by the fast moving air flow driven by the negative pressure generated by the internal combustion engine of the vehicle. One or more fluid passageways 420 can be provided at the upper surface of each of the baffle means 400 to allow the mist carrying, fast moving fluid stream to pass through. In the embodiment as shown in FIGS. 12 and 13, the fluid passageways 420 can be provided in the form of one or more elongated or triangularly shaped slots or through holes, for example. It would be readily understood that the configuration, size, number and position of the fluid passageways 420 can be tailored and customized according to the specific applications, and should not be limited to any of the described specific embodiments.

FIG. 13 further shows a flow directing member 500 arranged above the upper most baffle means 400 for directing flow of the mist carrying fluid stream towards the outlet 240 of the container. One or more filtering means 600 can further be provided above the plurality of agitating means 300, baffle means 400 and the flow directing member 500 to thereby filter and to further reduce the size of the liquid droplets. In this embodiment, the filtering means 600 can be configured to comprise a triangular, prismatic housing 602 adapted to stack above the housing 402 of the adjacent baffle means 400 for a secure positioning or connection. As described in the previous embodiment, the filtering means 600 are arranged with sufficiently small pores or through holes 604 which allow only liquid droplets of sufficiently small size to pass through. Droplets with larger size will be retained and returned to the upcoming fluid stream below for further size reduction. In this way, repeated cycles of filtering and size reduction by the cooperative actions of the agitating means 300, the baffle means 400, the flow directing means 500, the filtering means 600 as well as the continuous upward suction force from the outlet 240 and/or the internal combustion engine ensure mist with sufficiently small liquid droplets size be generated by the apparatus.

Structures of the agitating means 300, the baffle means 400, the flow directing member 500 and the filtering means 600 can be provided with similar configurations as to the agitating means 30, the baffle means 40, the flow directing member 50 and the filtering means 60 as above described in the previous embodiments, although it will be understood that the configurations, sizes, numbers and/or positions of these features can be tailored and customized according to the specific applications, and should not be limited to any of the described specific embodiments.

Figure 15:
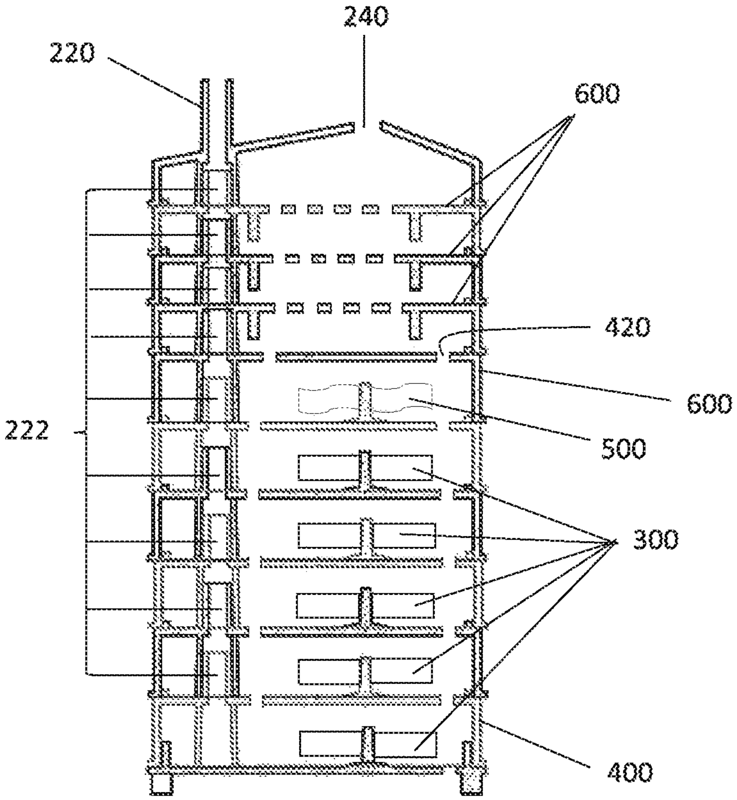
FIG. 15 is a side cross section view showing the mist generating apparatus of FIG. 12.

FIG. 15 illustrates an exemplified arrangement of the apparatus 100 having five baffle means 400 and five corresponding agitating means 300 housed therein, four filtering means 600, and one flow directing means 500. The plurality of the baffle means 400 and the filtering means 600 are securely stacked over one another to form a continuous column, with the internal cavity as defined by the various housings of the column being in fluid communication with the exterior via the inlet channel 220 and the outlet 240.

Figure 16:
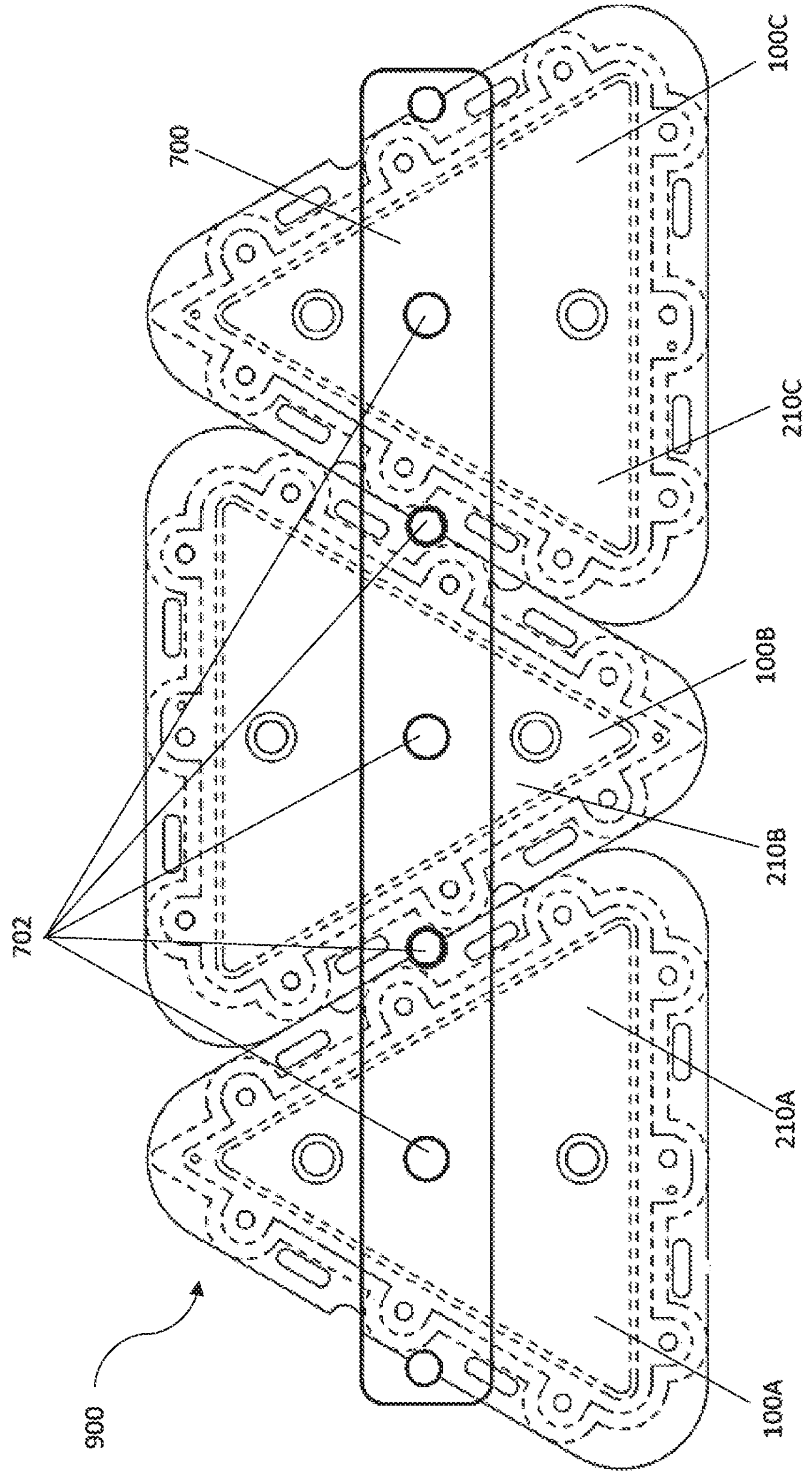
FIG. 16 is a top cross section view showing another embodiment of the mist generating system comprising three embodied mist generating apparatuses according to the present invention.

FIG. 16 shows a further embodiment of the system 900 of the present invention having three apparatuses 100 (100A, 100B and 100C) connected via a connecting means 700, which can be provided in the form of an elongated connecting portion 700 engageable with the corresponding lids 210A, 210B and 210C via, for example, screw connections 702.

As mentioned above, the number of the baffle means and the filtering means provided in each column or apparatus are adjustable and can be tailored to the specific applications and requirements. For example, it was observed that a system for use in diesel-fueled engine is preferred to comprise at least three apparatuses, with the first and the second containers each having 6 levels including 5 baffle means and 1 filtering means, and the third container having 9 levels including 5 baffle means and 4 filtering means; and that a system for use in gasoline-fueled engine is preferred to comprise two apparatuses, with the first container having 6 levels including 5 baffle means and 1 filtering means, and the second container having 9 levels including 5 baffle means and 4 filtering means.

Although the apparatus and/or the system of the present invention can be solely driven by the suction force from the internal combustion engine to thereby allow an economic and eco-friendly generation of mist with sufficiently small droplet sizes at high efficiency, one or more supplementary suction pumps may optionally be provided to enhance the suction power to the apparatus and/or the system and thus, further improve the mist generation performance in terms of mist flow rates and/or droplet sizes.

The mist generating apparatus and/or system of the present invention is advantageous in that, when used in a fuel-powered vehicle having an internal combustion engine, it helps in increasing efficiency of the combustion engine by, for example, lowering the operating temperature, and therefore, facilitating a higher performance of the vehicle with reduced pollutants emission. The liquid accommodated in the container of the apparatus may optionally comprise one or more performance enhancing agents and/or oxygen-enriched solutions to further improve performance of the engine, particularly after being atomized for a significant increase in surface area. In contrast to the prior art technologies which apply humid air from steam, external power is optional for the present invention as the agitating means can be driven solely by the suction force from the negative pressure developed by the internal combustion engine. In addition, the mist generating apparatus and/or system of the present invention provides an energy saving cooling effect which is known to play an important role in improving efficiency of the combustion engine. Furthermore, mist can be generated almost immediately once sufficient negative pressure is developed by the operating internal combustion engine, without any significant delay which will normally be required for warming up the system or heating up the water in the prior art technologies using steam. Lastly, the amount of generated mist, as well as the droplet size of the mist can be controlled by, for example, adjusting the number of the agitating means, the baffle means, the filtering means and the flow directing means of the apparatuses, and/or the number of the apparatuses being used in the system. High mist generating efficacy in terms of mist flow rates and/or liquid droplets sizes is achievable by the cooperative actions of the agitating means, the baffle means, the flow directing means, the filtering means of the present invention.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. An apparatus for generating mist, comprising:

a container adapted to accommodate a liquid, the container comprising an inlet for receiving an incoming fluid stream into the container, and an outlet via which an outgoing fluid stream exits the container;

at least one agitating means arranged in the container for agitating the accommodated liquid to generate droplets of the liquid;

a plurality of baffle means arranged in the container for controlling fluid flow in the container, each of the baffle means comprises one or more fluid passageways for the outgoing fluid stream to pass through;

wherein the agitating means is arranged to be driven by the incoming fluid stream, such that the generated liquid droplets are caused by the incoming fluid stream to form the outgoing fluid stream, and subsequently, exit the container; and wherein the one or more fluid passageways of the baffle means are of decreasing size from one baffle means to another towards the outlet and along a longitudinal axis of the container.

2. The apparatus according to claim 1, wherein the at least one agitating means is adapted to move about the longitudinal axis of the container.

3. The apparatus according to claim 2, wherein the at least one agitating means comprises a plurality of agitating means arranged along the longitudinal axis of the container.

4. The apparatus according to claim 3, wherein the plurality of agitating means are arranged to rotate about a common longitudinal axis of the container.

5. The apparatus according to claim 1, wherein the one or more fluid passageways are arranged at or near a peripheral edge of the baffle means.

6. The apparatus according to claim 1, wherein the baffle means are arranged to be substantially traverse to a flow direction of the outgoing fluid stream.

7. The apparatus according to claim 1, wherein the plurality of baffle means are arranged along the longitudinal axis of the container.

8. The apparatus according to claim 1, wherein the respective one or more fluid passageways of at least two adjacent baffle means of the plurality of baffle means are positioned to be offset from one another.

9. The apparatus according to claim 8, wherein the respective one or more fluid passageways of at least two adjacent baffle means are positioned at opposing ends of the respective baffle means.

10. The apparatus according to claim 1, wherein the at least one agitating means is arranged below and is substantially covered by a corresponding one of the plurality of baffle means.

11. The apparatus according to claim 10, wherein the at least one agitating means comprises a plurality of agitating means, with the plurality of agitating means and the plurality of baffle means being arranged in an alternating arrangement.

12. The apparatus according to claim 1, wherein the plurality of baffle means comprise an increasing number of fluid passageways from one baffle means to another towards the outlet and along the longitudinal axis of the container.

13. The apparatus according to claim 1, further comprising a fluid flow directing member adapted to direct flow of the outgoing fluid stream towards the outlet of the container.

14. The apparatus according to claim 1, further comprising at least one filtering means adapted to reduce size of the liquid droplets.

15. The apparatus according to claim 1, further comprising a liquid level sensor arranged at the container for detecting a level of the accommodated liquid.

16. A system for generating mist, comprising:

a plurality of apparatuses according to claim 1, the plurality of apparatuses comprising:

at least a first apparatus having a first inlet and a first outlet, and a second apparatus having a second inlet and a second outlet; wherein the first outlet is adapted to be connected with the second inlet to thereby allow fluid communication between the first apparatus and the second apparatus.

17. The system according to claim 16, wherein the first apparatus comprises a first number of agitating means and the second apparatus comprises a second number of agitating means, with the second number of agitating means being larger than the first number of agitating means.

18. The system according to claim 16, wherein the first apparatus comprises a first number of baffle means and the second apparatus comprises a second number of baffle means, with the second number of baffle means being larger than the first number of the baffle means.

19. The system according to claim 16, wherein the plurality of apparatuses comprise at least three apparatuses connected in sequence and in fluid communication.

20. The system according to claim 16, further comprising at least one connecting means for connecting the plurality of apparatuses.

21. The system according to claim 16, wherein the plurality of apparatuses are each configured in a shape of a triangular prism to thereby allow a close packing arrangement of the apparatuses.

* * * * *